United States Patent [19]
Walker

[11] Patent Number: 5,842,639
[45] Date of Patent: Dec. 1, 1998

[54] PAINT SPRAYER SCREEN

[76] Inventor: Willis Walker, Rt. 4 Box 1610, Summerton, S.C. 29148

[21] Appl. No.: 900,631

[22] Filed: Jul. 25, 1997

[51] Int. Cl.⁶ .................................................. B05B 17/00
[52] U.S. Cl. .............................. 239/1; 239/302; 239/575; 239/DIG. 14; 239/DIG. 23; 210/251; 210/499
[58] Field of Search ................................ 239/1, 104, 302, 239/462, 575, DIG. 14, DIG. 23; 210/251, 499, DIG. 17

[56] References Cited

U.S. PATENT DOCUMENTS

| | | | |
|---|---|---|---|
| 1,717,887 | 6/1929 | Noack . | |
| 1,777,925 | 10/1930 | Kollmann | 239/DIG. 14 X |
| 2,371,895 | 3/1945 | Kingman | 210/499 X |
| 3,245,540 | 4/1966 | Johnson | 210/291 |
| 3,419,082 | 12/1968 | O'Regan et al. | 169/15 |
| 3,603,512 | 9/1971 | Ham | 239/504 |
| 3,630,444 | 12/1971 | Nelson | 239/29 |
| 4,667,884 | 5/1987 | Braziel | 239/590 |
| 4,728,039 | 3/1988 | Johnson et al. | 239/296 |
| 4,746,063 | 5/1988 | Roberts | 239/1 |
| 4,899,938 | 2/1990 | Havrilla, Jr. | 239/294 |
| 4,948,053 | 8/1990 | Hufgard | 239/301 |
| 5,143,302 | 9/1992 | Sakuma | 239/599 |
| 5,417,906 | 5/1995 | Chiodo | 210/499 X |
| 5,452,856 | 9/1995 | Pritchard | 239/297 |
| 5,567,323 | 10/1996 | Harrison, Jr. | 210/499 X |

Primary Examiner—Andres Kashnikow
Assistant Examiner—Steve Ganey
Attorney, Agent, or Firm—Roberts & Mercanti, L.L.P.

[57] ABSTRACT

A filter for a liquid spraying device such as an airless paint sprayer. The filter separates unwanted foreign material and clumps from a liquid before the liquid is pumped into a liquid spraying device. The filter is removably mounted on a hose of a liquid spraying device to filter the liquid as it is extracted into the hose. The filter has a frusto-conical surface member having a hollow cavity, a top surface, and an open base terminating at an annular wall around the perimeter of the base. A plurality of holes surround the surface of the frusto-conical surface member wherein the holes are formed at an angle of about 90° to a plane spanning the base. Removably attached to the annular wall is a circular disk having a planar surface terminating at a ring such that the ring projects about perpendicularly from the planar surface. The circular disk has a coupling projecting about perpendicularly around a center point of the planar surface.

20 Claims, 3 Drawing Sheets

PAINT SPRAYER SCREEN

BACKGROUND OF THE INVENTION

1. Field of the Invention

The present invention pertains to liquid spraying devices such as airless paint sprayers. More particularly, the present invention relates to a paint filter which separates unwanted foreign material from the liquid prior to being supplied to a liquid spraying device.

2. Description of the Prior Art

Pressurized air-powered or airless liquid sprayers, commonly referred to as spray guns, have been used for a considerable number of years for applying paint or other liquid material to a surface or object. These sprayers generally have a pistol grip handle and an outwardly extending spray barrel which terminates at a discharge end where liquid exits the spray gun through a nozzle. The gun may be connected to a pump or compressor or other source of pressurized air, whereby actuation of the pistol grip handle will trigger a release valve to extract liquid from the container through the hose and into the spray gun. Usually, the spray gun is attached to a pump via a hose, and second hose attaches the pump to a supply of paint or other liquid. The end of the second hose is usually submerged into a container of paint or other liquid.

Air and liquid are mixed in various manners whereby the liquid particles are atomized by the air and ejected from the nozzle to create an evenly distributed pattern on the object being coated. Examples of some of these known prior art spray nozzles are disclosed in U.S. Pat. Nos. 4,728,039 and 4,899,938.

One problem with the use of such spray guns is that unwanted foreign particles or clumps tend to be present in the container of liquid and hence may be pulled through the liquid supply hose and into the pump or the spray gun. This may cause the pump or the gun to become clogged, jammed, or even broken. Furthermore, foreign material being sprayed out of the gun may damage or destroy the area or object being sprayed.

Numerous types of filters have been developed for use with liquid spray guns for removing foreign particles or clumps from the liquid to be discharged therefrom. A problem with these paint filters is that when viscous liquids, especially paint, become dried the filter tends to clog. Such prior art filters are difficult or impossible to clean when clogged, or difficult to remove from the hose.

Therefore, it would be desirable to devise an improved filter which is capable of preventing unwanted foreign material and clumps from entering the liquid supply hose, and for the filter to also be easily cleanable and easily detachable from the hose. It has been found that the present invention is capable of meeting these objectives.

SUMMARY OF THE INVENTION

The present invention provides a filter for a paint sprayer comprising:
- (a) a frusto-conical surface member having a hollow cavity, a top surface, and an open base terminating at an annular wall around the perimeter of the base; a plurality of holes around the surface of the frusto-conical surface member, which holes are formed through the frusto-conical surface member at an angle of about 90° to a plane spanning the base;
- (b) a circular disk having a planar surface terminating at a ring, which ring projects about perpendicularly from the planar surface; said circular disk having a coupling projecting about perpendicularly around a center point of the planar surface; said ring being removably attached around the annular wall.

The invention also provides a paint sprayer comprising a paint spray device having a paint supply hose and a filter attached to the hose, which filter comprises:
- (a) a frusto-conical surface member having a hollow cavity, a top surface, and an open base terminating at an annular wall around the perimeter of the base; a plurality of holes around the surface of the frusto-conical surface member, which holes are formed through the frusto-conical surface member at an angle of about 90° to a plane spanning the base;
- (b) a circular disk having a planar surface terminating at a ring, which ring projects about perpendicularly from the planar surface; said circular disk having a coupling projecting about perpendicularly around a center point of the planar surface; said ring being removably attached around the annular wall.

The invention further provides a method for spraying a liquid comprising:
- i) attaching a filter to a liquid supply hose;
- ii) sequentially passing a liquid through the filter and the liquid supply hose to a spraying device; and
- iii) spraying the liquid with the spraying device; which filter comprises:
  - (a) a frusto-conical surface member having a hollow cavity, a top surface, and an open base terminating at an annular wall around the perimeter of the base; a plurality of holes around the surface of the frusto-conical surface member, which holes are formed through the frusto-conical surface member at an angle of about 90° to a plane spanning the base;
  - (b) a circular disk having a planar surface terminating at a ring, which ring projects about perpendicularly from the planar surface; said circular disk having a coupling projecting about perpendicularly around a center point of the planar surface; said ring being removably attached around the annular wall.

DETAILED DESCRIPTION OF THE PREFERRED EMBODIMENT

Figure 1:
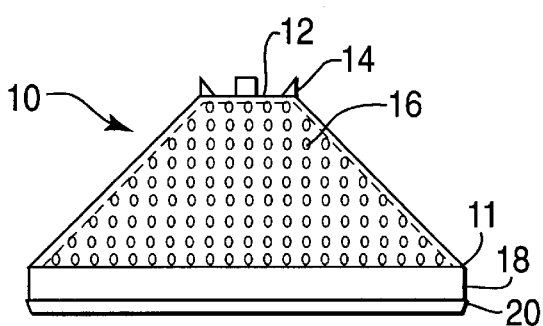
FIG. 1 is a side view of a frusto-conical surface member of the present invention.
Figure 2:
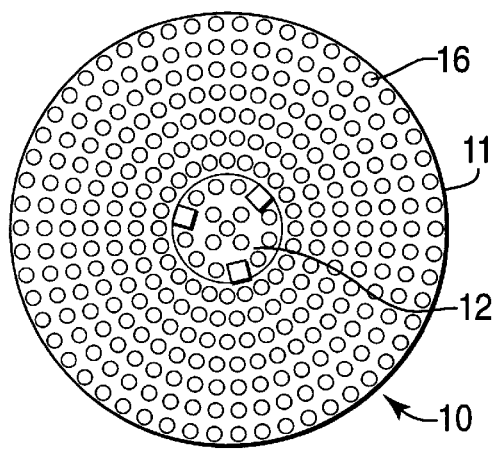
FIG. 2 is a top view of a frusto-conical surface member.
Figure 3:
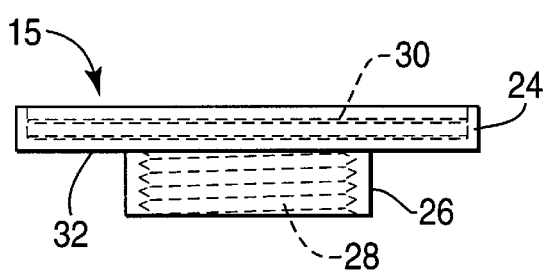
FIG. 3 is a side view of a threaded circular disk.

Referring to the drawings and particularly to FIGS. 1 and 2, a filter according to the present invention is shown to comprise a frusto-conical surface member or cone 10 which has a plurality of holes 16 drilled or otherwise formed through its surface. The holes are formed or drilled at an angle of about 90° to an imaginary plane spanning across cone base 11. Cone 10 terminates at an annular wall 18 around the perimeter of the base 11. Cone 10 preferably has a raised lip 20 around the outer surface of the annular wall 18 at the base 11 for attachment to a circular disk portion 15 as shown in FIG. 3. Cone 10 further has a top surface 12 also having holes 16. The top surface 12 also has a series of projections 14. These projections allow the screen to stand upright at the bottom of a paint container so that the holes 16 in the top surface 12 are not blocked by the container.

It is preferred that the holes 16 be formed at an angle of about 90° to the plane spanning the base to maximize filtering of foreign material from a liquid. The angle of the holes direct the flow of liquid directly into the opening of a liquid supply hose for even distribution of liquid to a spray gun. This results in better filtration and a more even coating of liquid onto an object or surface.

Figure 4:
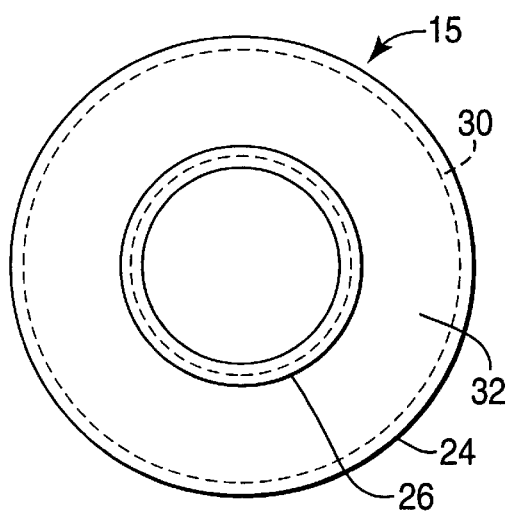
FIG. 4 is a top view of a threaded circular disk.

FIGS. 3 and 4 show a circular disk 15 which is to be attached to the cone 10. The disk 15 comprises a planar surface 32 terminating at a ring 24 which projects perpendicularly outward from surface 32. Ring 24 preferably also has a bead 30 around the inner surface of ring 24 for attachment to cone at lip 20 as shown in FIGS. 1 and 2. The circular disk 15 further comprises a coupling 26 for attachment to a hose. It is preferable that coupling 26 comprises threads 28 for screw mounting.

Figure 5:
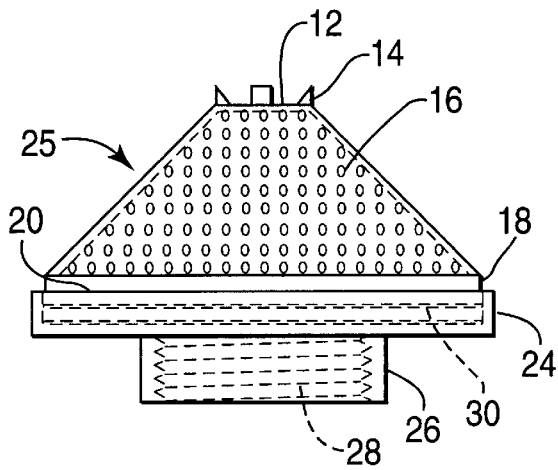
FIG. 5 is a side view of a screen of the present invention comprising a frusto-conical surface member of FIGS. 1 and 2 attached to a circular disk of FIGS. 3 and 4.
Figure 6:
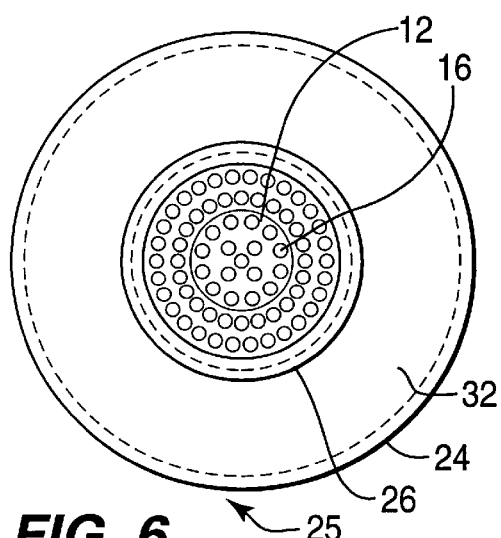
FIG. 6 is a bottom view of a filter of the present invention comprising a frusto-conical surface member of FIGS. 1 and 2 attached to a circular disk of FIGS. 3 and 4.

FIGS. 5 and 6 show a combined overall filter 25 formed by attaching the cone 10 from FIGS. 1 and 2 to the circular disk 15 from FIGS. 3 and 4. It is most preferred that the filter of the present invention comprises a plastic material. Plastic is preferred since it is inexpensive and makes the screen easy to clean and to take apart. In the most preferred embodiment, cone 10 and circular disk 15 are attached via a quick snap connection between lip 20 of cone 10 and bead 30 of circular disk 15, however, other connections between the cone and disk are within the contemplation of the invention. These nonexclusively include a screw connection, dove-tails and other mating methods which are well known in the art. These parts are most preferred to be easily removably attachable from one another for easy cleaning of the filter.

Figure 7:
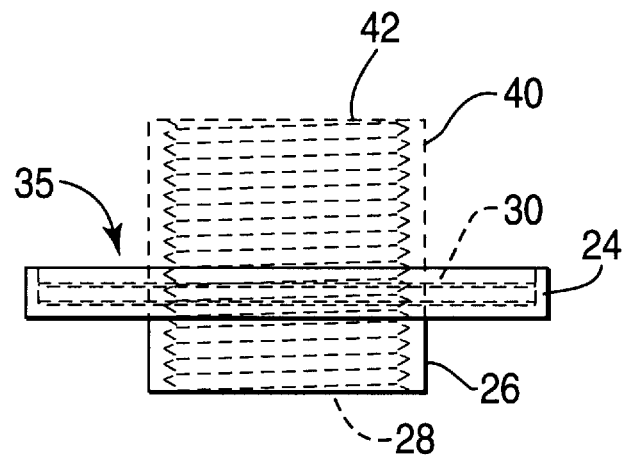
FIG. 7 is a side view of a circular disk having internal threads.
Figure 8:
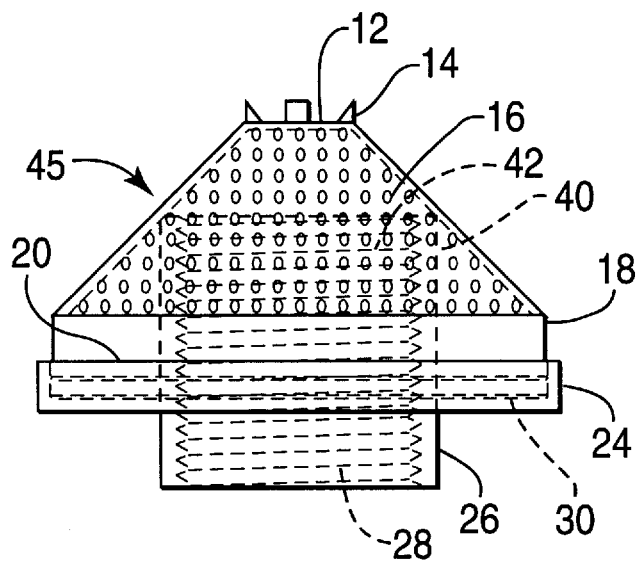
FIG. 8 is a side view of a filter of the present invention comprising a frusto-conical surface member attached to the circular disk of FIG. 7 having internal threads.

Another embodiment of the present invention is shown in FIGS. 7 and 8. FIG. 7 shows circular disk 35 according to the present invention, which comprises a circular disk comprising internal coupling 40 preferably having internal threads 42. FIG. 8 shows screen 45 which generally comprises cone 10 from FIGS. 1 and 2 and circular disk 35 from FIG. 7 which are attached via connection between lip 20 of cone 10 and bead 30 of circular disk 35. The internal threading shown in FIGS. 7 and 8 preferably extends to within about one-quarter inch of the inner surface of cone 10. Internal threading can provide enhanced filtering of liquid through the filter of the present invention.

Figure 9:
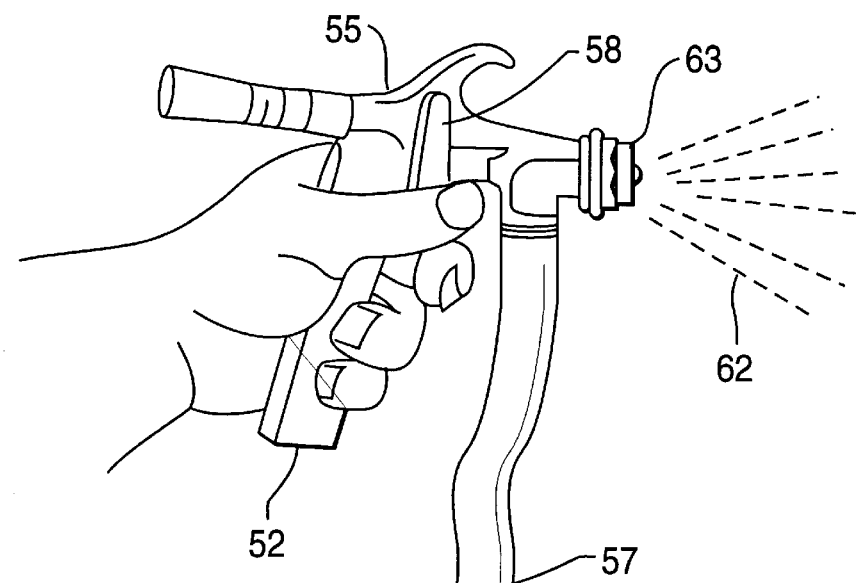
FIG. 9 is a side view of a liquid spray gun, a pump, and a hose connected to a filter of the present invention.
Figure 9:
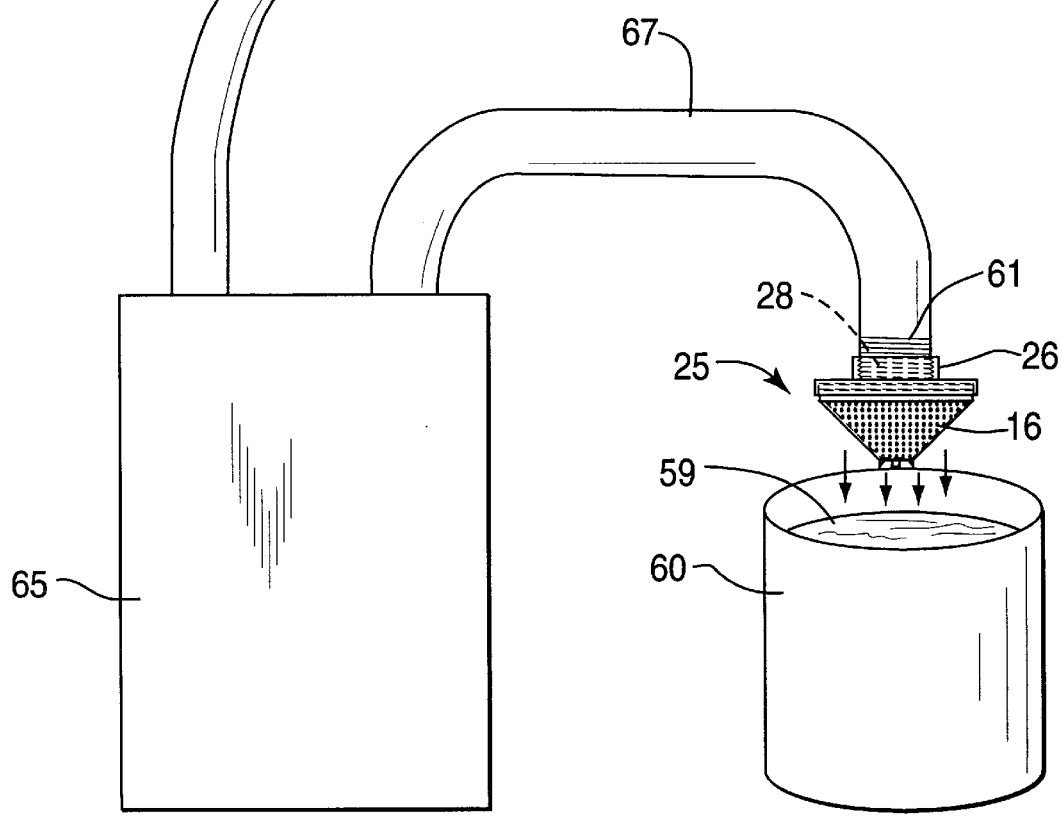

FIG. 9 illustrates a well known type of liquid spray gun on which the filter of the present invention is intended to be mounted. Liquid spray gun 55 is a paint spray gun which is attached to a pump 65 by a liquid supply hose 57. FIG. 9 represents a preferred embodiment of the present invention wherein filter 25 from FIGS. 5 and 6 is removably attached to liquid supply hose 67. In the most preferred embodiment, coupling 26 on disk 15 comprises threads 28 for screw mounting the filter 25 onto threads 61 of hose 67. Spray gun 55 includes a pistol grip handle 52 and a trigger 58 which controls the rate of liquid extraction. The filter 25, when mounted to hose 67, is preferred to be entirely immersed in a liquid 59 inside a liquid reservoir 60. When trigger 58 is engaged, the pump 65 pumps the liquid 59 from the liquid reservoir 60, through the holes 16 of filter 25, and into the hose 67. The liquid is then pumped by pump 65 through hose 57 to spray gun 55 and is discharged out of a nozzle 63. The discharge of liquid through an opening in nozzle 63 atomizes the liquid 59 into a liquid spray 62. Although the filter of the present invention is described as a filter for a liquid spray gun, a principal use is as a filter for a paint spray gun. However, its features and results can be used with and achieved with other liquids, pumps, and hoses.

The filter of the present invention provides an effective, inexpensive, and efficient device which filters unwanted foreign material and clumps from liquid pumped through a spraying device. Because the filter can be taken apart, it is easily cleanable from both the inside and the outside. The filter is also easily removable from the spraying device.

In the foregoing description, certain terms have been used for brevity, clearness, and understanding. No unnecessary limitations are to be implied therefrom beyond the requirements of the prior art because such terms are used for descriptive purposes and are intended to be broadly construed. The description and illustrations of the invention are by way of example, and the scope of the invention is not limited to the exact details shown or described.

What is claimed is:

1. A filter for a paint sprayer comprising:
    (a) a frusto-conical surface member having a hollow cavity, a top surface, and an open base terminating at an annular wall around the perimeter of the base; a plurality of holes around the surface of the frusto-conical surface member, which holes are formed through the frusto-conical surface member at an angle of about 90° to a plane spanning the base;
    (b) a circular disk having a planar surface terminating at a ring, which ring projects about perpendicularly from the planar surface; said circular disk having a coupling projecting about perpendicularly around a center point of the planar surface; said ring being removably attached around the annular wall.

2. The filter of claim 1 wherein the holes are disposed through the top surface, and in a pattern of concentric circles around the frusto-conical surface.

3. The filter of claim 1 wherein the ring is attached to the annular wall by means of a lip around an outer surface of the annular wall which engages with a bead around an inner surface of the ring.

4. The filter of claim 1 wherein said coupling is threaded.

5. The filter of claim 1 wherein said coupling is internally threaded.

6. The filter of claim 1 wherein said coupling projects outwardly away from the hollow cavity of the frusto-conical surface member.

7. The filter of claim 1 wherein said coupling projects into the hollow cavity of the frusto-conical surface member.

8. The filter of claim 1 wherein said coupling projects into the hollow cavity to within a distance of about one-quarter inch from the frusto-conical surface member.

9. The filter of claim 1 wherein said frusto-conical surface member comprises at least three spurs extending outwardly from the top surface.

10. The filter of claim 1 wherein the screen comprises a plastic material.

11. The filter of claim 1 wherein the holes are disposed through the top surface, and in a pattern of concentric circles around the frusto-conical surface; wherein the ring is attached to the annular wall by means of a lip around an outer surface of the annular wall which engages with a bead around an inner surface of the ring; wherein said coupling is internally threaded; wherein said coupling projects outwardly away from the hollow cavity of the frusto-conical surface member; and wherein the filter comprises a plastic material.

12. The filter of claim 1 wherein the holes are disposed through the top surface, and in a pattern of concentric circles around the frusto-conical surface; wherein the ring is attached to the annular wall by means of a lip around an outer surface of the annular wall which engages with a bead around an inner surface of the ring; wherein said coupling is internally threaded; wherein said coupling projects into the hollow cavity of the frusto-conical surface member; and wherein the filter comprises a plastic material.

13. A paint sprayer comprising a paint spray device having a paint supply hose and a filter attached to the hose, which filter comprises:

(a) a frusto-conical surface member having a hollow cavity, a top surface, and an open base terminating at an annular wall around the perimeter of the base; a plurality of holes around the surface of the frusto-conical surface member, which holes are formed through the frusto-conical surface member at an angle of about 90° to a plane spanning the base;

(b) a circular disk having a planar surface terminating at a ring, which ring projects about perpendicularly from the planar surface; said circular disk having a coupling projecting about perpendicularly around a center point of the planar surface; said ring being removably attached around the annular wall.

14. The paint sprayer of claim 13 wherein said filter is attached around the hose by means of the coupling.

15. The paint sprayer of claim 13 wherein the holes are disposed through the top surface, and in a pattern of concentric circles around the frusto-conical surface; wherein the ring is attached to the annular wall by means of a lip around an outer surface of the annular wall which engages with a bead around an inner surface of the ring; wherein said coupling is internally threaded; wherein said coupling projects outwardly away from the hollow cavity of the frusto-conical surface member; and wherein the filter comprises a plastic material.

16. The paint sprayer of claim 13 wherein the holes are disposed through the top surface, and in a pattern of concentric circles around the frusto-conical surface; wherein the ring is attached to the annular wall by means of a lip around an outer surface of the annular wall which engages with a bead around an inner surface of the ring; wherein said coupling is internally threaded; wherein said coupling projects into the hollow cavity of the frusto-conical surface member; and wherein the filter comprises a plastic material.

17. A method for spraying a liquid comprising:

i) attaching a filter to a liquid supply hose;

ii) sequentially passing a liquid through the filter and the liquid supply hose to a spraying device; and iii) spraying the liquid with the spraying device; which filter comprises:

(a) a frusto-conical surface member having a hollow cavity, a top surface, and an open base terminating at an annular wall around the perimeter of the base; a plurality of holes around the surface of the frusto-conical surface member, which holes are formed through the frusto-conical surface member at an angle of about 90° to a plane spanning the base;

(b) a circular disk having a planar surface terminating at a ring, which ring projects about perpendicularly from the planar surface; said circular disk having a coupling projecting about perpendicularly around a center point of the planar surface; said ring being removably attached around the annular wall.

18. The method of claim 17 wherein the liquid comprises paint.

19. The method of claim 17 wherein the holes are disposed through the top surface, and in a pattern of concentric circles around the frusto-conical surface; wherein the ring is attached to the annular wall by means of a lip around an outer surface of the annular wall which engages with a bead around an inner surface of the ring; wherein said coupling is internally threaded; wherein said coupling projects outwardly away from the hollow cavity of the frusto-conical surface member; and wherein the filter comprises a plastic material.

20. The method of claim 17 wherein the holes are disposed through the top surface, and in a pattern of concentric circles around the frusto-conical surface; wherein the ring is attached to the annular wall by means of a lip around an outer surface of the annular wall which engages with a bead around an inner surface of the ring; wherein said coupling is internally threaded; wherein said coupling projects into the hollow cavity of the frusto-conical surface member; and wherein the filter comprises a plastic material.

* * * * *